US009108690B2

(12) United States Patent
Rowlands

(10) Patent No.: US 9,108,690 B2
(45) Date of Patent: Aug. 18, 2015

(54) MOTORISED WHEELBARROW

(76) Inventor: Terry Charles Rowlands, Port St. Lucie, FL (US)

( * ) Notice: Subject to any disclaimer, the term of this patent is extended or adjusted under 35 U.S.C. 154(b) by 0 days.

(21) Appl. No.: 13/392,392

(22) PCT Filed: Aug. 25, 2010

(86) PCT No.: PCT/GB2010/001605
§ 371 (c)(1),
(2), (4) Date: Feb. 24, 2012

(87) PCT Pub. No.: WO2011/023952
PCT Pub. Date: Mar. 3, 2011

(65) Prior Publication Data
US 2012/0146386 A1    Jun. 14, 2012

(30) Foreign Application Priority Data
Aug. 25, 2009    (GB) .................................. 0914901.4

(51) Int. Cl.
*B62B 3/08*    (2006.01)
*B62D 51/00*    (2006.01)
(Continued)

(52) U.S. Cl.
CPC ............... *B62D 51/002* (2013.01); *B60L 7/003* (2013.01); *B60L 11/18* (2013.01); *B60L 11/1853* (2013.01);
(Continued)

(58) Field of Classification Search
CPC .. B62B 5/0026; B62B 5/0033; B62B 5/0053; B62B 3/08; B62B 1/18; B62B 1/24; B60P 1/04; B60P 1/24; B60P 1/34; B62D 51/00; B62D 51/04; B62D 51/002; B60K 1/04; B60L 2200/40; B60L 2260/28; B60L 11/18; B60L 11/1853; B60L 11/1877

USPC ............... 180/19.1, 19.3, 215, 216, 65.1; 280/653, 47.31, 47.131, 47.17, 47.24, 280/47.26, 47.34; 298/1 C, 2, 10
See application file for complete search history.

(56) References Cited

U.S. PATENT DOCUMENTS 2,533,549 A * 12/1950 Bell ................................... 298/2
2,918,133 A * 12/1959 Ericsson ....................... 180/19.1
(Continued)

FOREIGN PATENT DOCUMENTS

DE    4030879 A1 *    4/1991    ................ B62B 1/18
DE    4226969 A1 *    2/1994    ................ B60P 1/04
(Continued)

OTHER PUBLICATIONS
DJ Products, Inc. "Motorized Dump Hopper" Jun. 9, 2009.*
(Continued)

*Primary Examiner* — J. Allen Shriver, II
*Assistant Examiner* — Steve Clemmons
(74) *Attorney, Agent, or Firm* — Collard & Roe, P.C.

(57) ABSTRACT

A pedestrian motorised wheelbarrow having a front axle member mounting two front road-wheels, a back axle member mounting two back road-wheels, an electric motor mounted towards the rear to drive directly the rear two wheels which in turn drive the front two wheels, a carrier for a battery-pack to power the motor arranged for substantially the whole battery-pack weight to be at the front axle member, the empty wheelbarrow having more than half its weight on the front axle member, a hopper such that its load will be mainly on the front axle member, handles for tilting the wheelbarrow to lift the rear wheels off the ground, and a brake operating automatically upon interruption of the motor's power supply; the hopper being pivotally mounted so that, upon sudden braking, it will tend to pivot to eject its load forwards subject to a releasable catch worked from the handle area.

12 Claims, 1 Drawing Sheet

(51) Int. Cl.
*B60L 7/00* (2006.01)
*B60L 11/18* (2006.01)
*B60P 1/24* (2006.01)
*B62D 51/04* (2006.01)
B62B 5/00 (2006.01)
B62B 5/04 (2006.01)

(52) U.S. Cl.
CPC .............. *B60L 11/1877* (2013.01); *B60P 1/24* (2013.01); *B62B 3/08* (2013.01); *B62D 51/04* (2013.01); *B60L 2200/30* (2013.01); *B60L 2200/40* (2013.01); *B60L 2250/24* (2013.01); *B60L 2260/28* (2013.01); *B62B 5/0046* (2013.01); *B62B 5/0053* (2013.01); *B62B 5/0066* (2013.01); *B62B 5/0404* (2013.01); *Y02T 10/705* (2013.01); *Y02T 10/7005* (2013.01)

(56) References Cited

U.S. PATENT DOCUMENTS

| | | | | |
|---|---|---|---|---|
| 3,160,439 | A * | 12/1964 | Kazakowitz | 298/2 |
| 3,433,002 | A * | 3/1969 | Custance | 56/10.8 |
| 3,515,313 | A * | 6/1970 | Siems | 222/623 |
| 4,305,030 | A * | 12/1981 | Lorenz | 318/758 |
| 4,632,461 | A * | 12/1986 | Randolph | 298/2 |
| 4,645,264 | A * | 2/1987 | Morrison | 298/1 H |
| 4,811,988 | A * | 3/1989 | Immel | 298/2 |
| RE33,131 | E * | 12/1989 | Morrison | 298/1 H |
| 5,106,113 | A * | 4/1992 | Piacentini | 280/47.21 |
| 5,149,116 | A * | 9/1992 | Donze et al. | 280/47.26 |
| 5,284,218 | A * | 2/1994 | Rusher, Jr. | 180/19.1 |
| 5,350,030 | A * | 9/1994 | Mawhinney et al. | 180/19.3 |
| 6,065,555 | A * | 5/2000 | Yuki et al. | 180/19.1 |
| 6,129,166 | A * | 10/2000 | Sueshige et al. | 180/65.6 |
| 6,155,648 | A * | 12/2000 | Dombek et al. | 298/1 C |
| 6,173,799 | B1 * | 1/2001 | Miyazaki et al. | 180/19.3 |
| 6,290,301 | B1 * | 9/2001 | Bockman | 298/5 |
| 6,293,627 | B1 * | 9/2001 | Jansen et al. | 298/1 C |
| 6,390,213 | B1 | 5/2002 | Bleicher | |
| 6,415,880 | B1 * | 7/2002 | Strothmann | 180/19.3 |
| 6,470,981 | B1 * | 10/2002 | Sueshige et al. | 180/19.3 |
| 6,536,845 | B2 * | 3/2003 | Jansen et al. | 298/1 C |
| 6,578,924 | B2 * | 6/2003 | Jansen et al. | 298/1 C |
| 6,619,754 | B1 * | 9/2003 | Dombek et al. | 298/1 C |
| 6,848,526 | B2 * | 2/2005 | Burt et al. | 180/69.4 |
| 6,955,404 | B1 * | 10/2005 | Best et al. | 298/1 C |
| 7,017,998 | B2 * | 3/2006 | Ducharme | 298/2 |
| 7,201,453 | B2 * | 4/2007 | Vandewinckel et al. | 298/1 C |
| D572,274 | S * | 7/2008 | Buck et al. | D15/22 |
| 7,845,654 | B2 * | 12/2010 | Price, Jr. | 280/47.34 |
| 2001/0000641 | A1 * | 5/2001 | Dombek et al. | 298/7 |
| 2002/0084119 | A1 | 7/2002 | Brabetz et al. | |
| 2003/0193233 | A1 * | 10/2003 | Brant | 298/2 |
| 2005/0168004 | A1 * | 8/2005 | Vandewinckel et al. | 296/26.12 |
| 2005/0212237 | A1 * | 9/2005 | Lin | 280/47.31 |
| 2006/0119164 | A1 * | 6/2006 | Heskin | 298/1 C |
| 2007/0079998 | A1 * | 4/2007 | Walter | 180/19.1 |
| 2007/0194544 | A1 * | 8/2007 | Price | 280/47.34 |
| 2007/0216215 | A1 * | 9/2007 | Vandewinckel et al. | 298/22 C |
| 2007/0261905 | A1 * | 11/2007 | Lin | 180/213 |
| 2009/0178864 | A1 * | 7/2009 | Robinson et al. | 180/19.3 |

FOREIGN PATENT DOCUMENTS

| | | | |
|---|---|---|---|
| EP | 1 170 162 | 1/2002 | |
| FR | 2 695 699 | 3/1994 | |
| GB | 2358005 A * | 7/2001 | ............ B62D 51/06 |
| GB | 2 392 425 | 3/2004 | |
| GB | 2 402 378 | 12/2004 | |
| GB | 2 417 716 | 3/2006 | |
| JP | 05085362 A * | 4/1993 | ............ B62B 1/00 |
| JP | 2000-264213 | 9/2000 | |

OTHER PUBLICATIONS

International Search Report and Written Opinion for PCT/GB2010/001605 filed on Aug. 25, 2010 which was mailed on Nov. 1, 2011, 15 pages.

International Preliminary Report on Patentability for PCT/GB2010/001605 filed on Aug. 25, 2010 which was mailed on Feb. 28, 2012, 1 page.

English Search Report for GB/0914901.4, date of search Apr. 16, 2010, 2 pages.

* cited by examiner

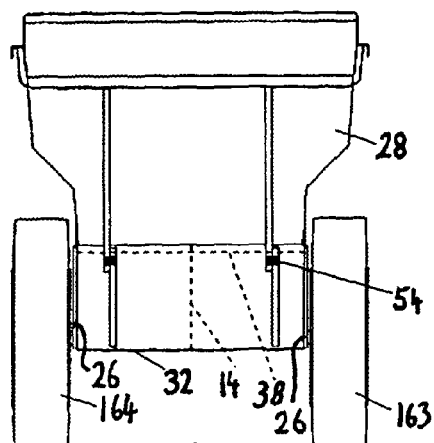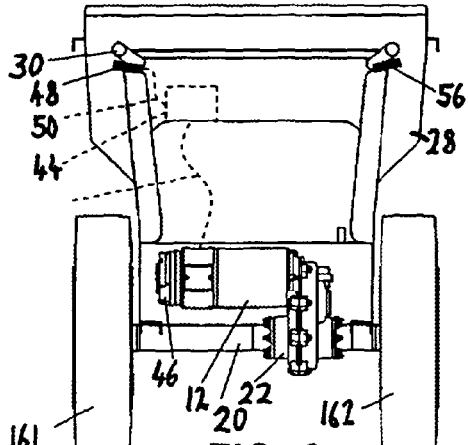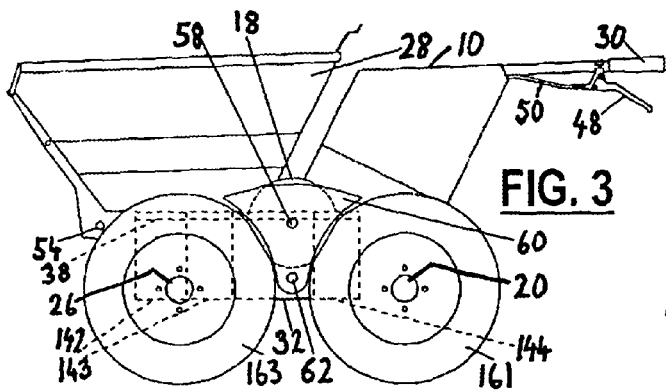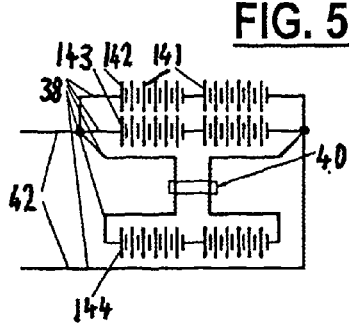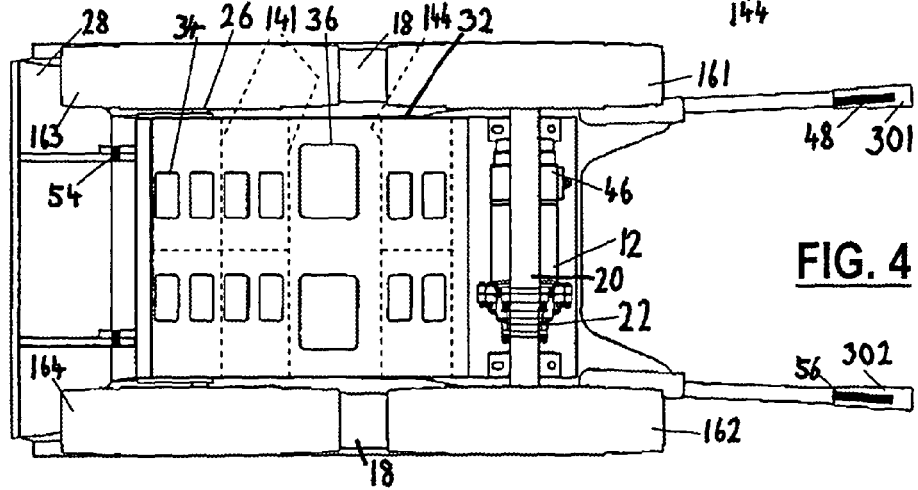

MOTORISED WHEELBARROW

CROSS REFERENCE TO RELATED APPLICATIONS

This application is the National Stage of PCT/GB2010/001605 filed on Aug. 25, 2010, which claims priority under 35 U.S.C. §119 of Great Britain application No. 0914901.4 filed on Aug. 25, 2009, the disclosure of which is incorporated by reference. The international application under PCT article 21(2) was published in English.

This invention relates to vehicles, particularly powered (also called motorised) wheelbarrows, also called micro-dumpers, and more particularly pedestrian (also called walk-with) wheelbarrows of the so-called four-wheel kind, namely having front axle means and back axle means with two front road-wheels mounted to the front axle means and two back road-wheel means mounted to the back axle means.

BACKGROUND

Currently, pedestrian motorised wheelbarrows of the so-called four-wheel kind are exclusively driven by liquid fuel (e.g. petrol, in the USA called gasoline) motors. This is traditional in the industry, e.g. in the fields of building, construction or do-it-yourself.

THE INVENTION

It would not even cross one's mind to apply electrical propulsion to such a wheelbarrow because the difficulties and problems would appear insurmountable. However, the present inventor, having thought of the idea of doing this, and with particular engineering skills and inventiveness, has been able to provide a series of features to make this idea practicable.

Accordingly, one aspect of the invention provides a pedestrian motorised wheelbarrow of the so-called four-wheel kind (as defined herein) comprising an electric motor to drive the wheelbarrow and adapted for battery means, to be carried by the wheelbarrow to power the motor, to be (or to exert substantially their whole weight) in the region of the front axle means. Either of such axle means (or both) may, for example, be a pair of stub axles.

Preferably, the wheelbarrow is a four-wheel drive vehicle, preferably one in which all four wheels are driven by the single electric motor. Preferably, the motor is arranged to drive two of the wheels directly and these wheels in turn are arranged to drive the other two wheels. Preferably, the wheelbarrow comprises two jockey wheels arranged to transmit drive from the directly driven two wheels to said other two wheels, respectively. This means that each jockey wheel frictionally engages a said directly driven wheel and a said other wheel in order to transmit drive between them. Such a set of three wheels is arranged on each side of the wheelbarrow.

Preferably, said directly driven wheels are the rear wheels of the wheelbarrow and said other wheels are the front wheels of the wheelbarrow. Preferably, the wheelbarrow comprises a differential axle having a differential gearbox and said directly driven wheels are mounted to this axle and said motor is connected to drive this axle by way of the gearbox. Preferably, said other wheels are mounted independently of each other.

Preferably, the wheelbarrow is adapted to have, when empty, a weight distribution with more than half its weight in, or exerted in, the region of or resting on its front axle means. Preferably, the wheelbarrow is adapted to have a hopper which, when loaded evenly, will be such that the load will bear, or be exerted, substantially entirely in the region of or resting on the front axle means. Preferably, the wheelbarrow comprises handle means for tilting the wheelbarrow so as to lift the rear wheels off the ground, e.g. for changing the direction of progress of the wheelbarrow, and is preferably such that the horizontal distance from the front axle means to the handle means is more than twice or substantially twice or in the range 2 to 2.2 or 2 to 2.4 times the horizontal distance from the front axle means to the back axle means.

Preferably, the wheelbarrow is such that the required upwards force on the handle means for lifting the rear wheels off the ground is not substantially increased when the hopper has an evenly distributed load compared with when it has no load. Preferably, the wheelbarrow is such that the total required upwards force on the handle means for lifting the rear wheels off the ground is less than 60 kg (more preferably less than: 50 or 40 or 35 or 30 or 25 kg) weight or in the range of 25 to 30 kg weight or substantially 25 kg weight, with the wheelbarrow empty and/or with any evenly distributed load in the hopper.

In the embodiments described, the wheelbarrow comprises mounting means for the battery means arranged to mount the battery means towards the front of the wheelbarrow. Preferably, the motor is mounted towards the rear of the wheelbarrow.

Preferably, the wheelbarrow has connection means for connecting two batteries in series to make a series pair and two such pairs in parallel, and possibly a third such series pair of batteries in parallel with the other two pairs.

Preferably, the wheelbarrow comprises a brake. Preferably, the motor comprises a motor housing which also houses the brake. Preferably, control of the brake is made automatic upon interruption of power supply to the motor. Preferably, the wheelbarrow comprises sensing means to sense when power is not being applied to the motor and then to apply the brake. Preferably, the sensing means are included in a controller for the motor. Preferably, the wheelbarrow comprises a speed/power control handle to apply power to the motor and effectively braking control to the brake. Preferably, this handle is situated on or adjacent said handle means.

Preferably, there is a pivotal mount for the hopper such that if the wheelbarrow is suddenly braked the hopper will tend pivotally to tilt or overturn to eject its load forwards. Preferably, the pivotal mount is arranged in the region of the front of the hopper and/or at a level that is below its load. Preferably, there are releasable catch means to lock the hopper against such pivotal movement, e.g. for safety during transport, until the user releases the catch means, e.g. just before braking, and there is preferably a release actuator handle situated on or adjacent said handle means, e.g. for ready manual release of the catch means.

Thus, the wheelbarrow comprises catch means releasable to release the hopper for pivotal movement to eject its load, and also comprises, situated on or adjacent said handle means both a release actuator handle operable to release said catch means and a speed/power control handle, and further comprises an automatic brake automatically operable upon cessation of drive power. Preferably, said handles are arranged for operation by respective hands of a user. Preferably, there is no separate actuator for the brake.

A notable advantage of the wheelbarrow is that the electric motor allows it to run substantially silently. Another aspect of the invention is a powered wheelbarrow adapted to run substantially silently.

Another notable advantage of the wheelbarrow is that the electric motor allows it to run substantially pollution-free.

Another aspect of the invention is a powered wheelbarrow adapted to run substantially pollution-free.

Another aspect of the invention provides a method of transporting material in which there is used any such wheelbarrow. Preferably, the material is ejected or dumped from the wheelbarrow by releasing a pivotally mounted hopper of the wheelbarrow and with the aid of stopping (or suddenly slowing down) forward movement of the wheelbarrow so that the hopper tilts forwards to eject or dump its load.

Another aspect of the invention provides material transported by any such method.

DESCRIPTION RELATING TO THE DRAWINGS

Reference will now be made by way of example to the accompanying drawings, in which:

FIG. 1 is a front view of a wheelbarrow embodying the invention;

FIG. 2 is rear view of the same;

FIG. 3 is a left hand side view of the same;

FIG. 4 is an underside view of the same; and

FIG. 5 is a circuit diagram of the battery arrangement of the same.

Referring to the drawings, identical references refer to the same item in different Figures or items that are identical or similar or have similar functions, and references with the same first two digits refer to items that are identical or similar or have similar functions. FIGS. 1 to 4 are substantially to scale.

A pedestrian wheelbarrow 10 comprising an electric motor 12 to drive the wheelbarrow 10 and adapted for battery means 14 to be carried by the wheelbarrow 10 to power the motor 12.

The wheelbarrow 10 is a four-wheel drive vehicle, in which all four wheels 16 (161, 162, 163, 164) are driven by the single electric motor 12. The motor 12 is arranged to drive two of the wheels 161, 162 directly and these wheels 161, 162 in turn are arranged to drive the other two wheels 163, 164. The wheelbarrow 10 comprises two jockey wheels 18, 18 arranged to transmit drive from the directly driven two wheels 161, 162 to said other two wheels 163, 164, respectively. This means that each jockey wheel 18 frictionally engages a said directly driven wheel 161 or 162 and a said other wheel 163 or 164 in order to transmit drive between them. Such a set of three wheels 161, 18, 163 or 162, 18 164 is arranged on each side of the wheelbarrow 10. Jockey wheel 18 in fact bears so heavily against the other two wheels 161, 163 or 162, 164 that the pneumatic tyres of all three are considerably flattened at the regions of engagement Each jockey wheel 18 is mounted to a stub axle 58 carried by a mounting plate 60 slightly pivotable on pivot 62 to the chassis of wheelbarrow 10.

Said directly driven wheels 161, 162 are the rear wheels 161, 162 of the wheelbarrow and said other wheels 163, 164 are the front wheels 163, 164 of the wheelbarrow 10. The wheelbarrow 10 comprises a differential axle 20 having a differential gearbox 22 and said directly driven wheels 161, 162 are mounted to this axle 20 and said motor 12 is connected to drive this axle 20 by way of the gearbox 22. Said other wheels 163, 164 are mounted independently of each other, each on a stub axle 26, leaving room for the battery means 14 to be situated between the stub axles 26.

The wheelbarrow 10 is adapted to have, when empty, a weight distribution with more than half its weight in, or exerted in, the region of or resting on its front axle means 26, 26 comprising stub axles 26, 26. The wheelbarrow 10 is adapted by its shape, mountings and fittings to have a hopper 28 which, when loaded evenly, will be such that the load will bear, or be exerted, substantially entirely in the region of or resting on the front axle means 26, 26, as can be seen most clearly from FIG. 3, showing that the hopper 28 is substantially symmetrical, back to front, about its centre which is over axle 26, 26. The wheelbarrow 10 comprises handle means 30 (301, 302) for tilting the wheelbarrow 10 so as to lift the rear wheels 161, 162 off the ground, e.g. for changing the direction of progress of the wheelbarrow 10, and is preferably such that the horizontal distance from the front axle means 26 to the handle means 30 is substantially twice the horizontal distance from the front axle means 26 to the back axle means 20. The wheelbarrow 10 is such that the required upwards force on the handle means 30 for lifting the rear wheels 161, 162 off the ground is not substantially increased when the hopper 28 has an evenly distributed load compared with when it has no load, since the load will bear, or be exerted, substantially entirely in the region of or resting on the front axle means 26, as mentioned above. The wheelbarrow 10 is such that the total required upwards force on the handle means 30 for lifting the rear wheels 161, 162 off the ground is in the range of substantially 25 to 50 kg, usually substantially 25 kg, weight with the wheelbarrow 10 empty and/or with any evenly distributed load, e.g. up to ¼ tonne, in the hopper 28.

The wheelbarrow 10 comprises mounting means 32 in the form of a housing 32 for the battery means 14 arranged to mount the battery means 14 towards the front of the wheelbarrow 10. Housing 32 has in its base weight-saving holes 34, one under each battery 14, and interior-access holes 36. The motor 12, relatively light in weight compared with the battery means 14, is mounted towards the rear of the wheelbarrow 10.

The wheelbarrow 10 has connection means 38 for connecting two 12V batteries 141, 141 in series to make a 24V series pair 142 and two such pairs 142, 143 in parallel, and possibly (by means of a double plug and socket 40) a third such series pair 144 of batteries in parallel with the other two pairs 142, 143. The connection means 38 connects via output leads 42 to a controller 44 for the motor 12.

The wheelbarrow 10 comprises a brake 46. The motor 12 comprises a motor housing which also houses the brake 46. Control of the brake 46 is made automatic upon interruption of power supply to the motor 12. The wheelbarrow 10 comprises sensing means included in controller 44 to sense when power is not being applied to the motor 12 and then to apply the brake 46. The wheelbarrow 10 comprises a speed/power control handle 48 (corresponding to the usual throttle control handle in a petrol motor wheelbarrow) situated on or adjacent said handle means 301 and connected via connector 50 to controller 44 to apply, via connector 52, power to the motor 12 and effectively braking control to brake 46. The braking control is arranged to kick in (automatically) after a short interval or delay, usually about 1 second after power to motor 12 is interrupted, to give the wheelbarrow 10 time to slow down or stop. Since the braking is automatic, the user has one less thing to worry about and/or to handle.

There is a pivotal mount 54 for the hopper 28 such that if the wheelbarrow 10 is suddenly braked the hopper 28 will tend pivotally to tilt or overturn to eject its load forwards. The pivotal mount 54 is arranged in the region of the front of the hopper 28 and at a level that is below its load. There are releasable catch means (not shown) to lock the hopper 28 against such pivotal movement, e.g. for safety during transport, until the user releases the catch means, e.g. just before braking, and there is a release actuator handle 56 situated on or adjacent said handle means 302, for ready manual release of the catch means.

Pivots 54, 54 may be set further back than is shown in FIG. 3. In front of them, there may be provided respective attaching holes in hopper 28 at which can be connected a tow bar (US terminology, 'tow hitch') or a snow plough. The hopper may be replaced by a flatbed, an L-shaped support having only a back and base and useful to transport e.g. stackable articles, e.g. paving stones. The term 'wheelbarrow' used herein must be understood to include such uses, and thus includes reference to a vehicle that has or is adapted to have a hopper (US terminology, 'bucket') for transporting loads, which vehicle or hopper can be upended to dump the load.

It will be apparent to one skilled in the art, that features of the different embodiments disclosed herein may be omitted, selected, combined or exchanged and the invention is considered to extend to any new and inventive combination thus formed. Where a preference or particularisation is stated, there is implied the possibility of its negative, i.e. a case in which that preference or particularisation is absent.

Many variations of the invention and embodiments hereinbefore described will be apparent to people skilled in the art and all such variations are to be considered as falling within the scope of the invention.

The invention claimed is:

1. A pedestrian motorized wheelbarrow comprising:
   a front axle assembly comprising a front axle and two front road-wheels;
   a rear axle assembly comprising a rear axle and two rear road-wheels;
   an electric motor connected to drive the rear wheels;
   a battery to power the motor and positioned to exert substantially its whole weight in the region of the front axle;
   a hopper arranged to tilt forward to dump its load;
   wherein the front axle and the rear axle assemblies are configured to be driven;
   wherein the wheelbarrow is a four-wheel drive vehicle, the electric motor is arranged to drive all four of said wheels, wherein the rear wheels are driven directly and drive the front wheels; and
   wherein the wheelbarrow comprises a handle for tilting the wheelbarrow so as to lift the rear wheels off the ground.

2. The wheelbarrow as claimed in claim 1, which is adapted to have, when empty, a weight distribution with more than half its weight in, or exerted in, the region of, or resting on, its front axle assembly.

3. The wheelbarrow as claimed in claim 1, in which the hopper is so arranged that, when loaded evenly, its load will bear, or be exerted, substantially in the region of or resting on the front axle assembly.

4. The wheelbarrow as claimed in claim 1, such that the horizontal distance from the front axle assembly to the handle is more than twice or substantially twice or in the range of 2 to 2.2 or 2 to 2.4 times the horizontal distance from the front axle assembly to the rear axle means.

5. The wheelbarrow as claimed in claim 1 in which the hopper is so arranged that the required upwards force on the handle for lifting the rear wheels off the ground is not substantially increased when the hopper has an evenly distributed load compared with when it has no load.

6. The wheelbarrow as claimed in claim 1, in which the motor is mounted towards the rear of the wheelbarrow.

7. The wheelbarrow as claimed in claim 1, in which the battery comprises a connection for connecting two batteries in series to make a series pair and two such pairs in parallel.

8. The wheelbarrow as claimed in claim 7, which comprises a connection for connecting a third such series pair of batteries in parallel with the other two pairs.

9. The wheelbarrow as claimed in claim 1, which comprises a brake and means connected to control the brake automatically upon interruption of power supply to the motor.

10. The wheelbarrow as claimed in claim 1, comprising a pivotal mount for the hopper so arranged that upon sudden braking of the wheelbarrow, the hopper will tend to undergo pivotal movement to tilt or overturn to eject its load forwards.

11. The wheelbarrow as claimed in claim 10, comprising a catch to restrain the hopper from said pivotal movement and releasable to release the hopper for said pivotal movement to eject its load upon said sudden braking.

12. The wheelbarrow as in claim 1, wherein the battery comprises a battery pack and a coupling for coupling the battery pack to the electric motor.

* * * * *